(12) United States Patent
Forster

(10) Patent No.: US 11,842,243 B2
(45) Date of Patent: Dec. 12, 2023

(54) RFID SYSTEMS FOR USE WITH TIRES

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/788,799

(22) PCT Filed: Dec. 28, 2020

(86) PCT No.: PCT/US2020/067143
§ 371 (c)(1),
(2) Date: Jun. 24, 2022

(87) PCT Pub. No.: WO2021/134062
PCT Pub. Date: Jul. 1, 2021

(65) Prior Publication Data
US 2023/0034241 A1    Feb. 2, 2023

Related U.S. Application Data

(60) Provisional application No. 62/954,475, filed on Dec. 28, 2019.

(51) Int. Cl.
*G06K 19/077* (2006.01)
(52) U.S. Cl.
CPC . *G06K 19/07764* (2013.01); *G06K 19/07773* (2013.01)
(58) Field of Classification Search
CPC .................. G06K 19/07764; G06K 19/07773
(Continued)

(56) References Cited

U.S. PATENT DOCUMENTS 7,132,930 B2    11/2006    Wilson et al.
7,616,121 B2    11/2009    Kawai et al.
(Continued)

FOREIGN PATENT DOCUMENTS

EP    1776660    4/2007
EP    3284618    2/2018
(Continued)

OTHER PUBLICATIONS

International Preliminary Report on Patentability dated Jun. 28, 2022 issued in corresponding IA No. PCT/US2020/067143 filed Dec. 28, 2020.
(Continued)

*Primary Examiner* — Allyson N Trail

(57) ABSTRACT

Radio frequency identification (RFID) systems for use with tires include a stud comprising reactive strap technology including an RFID chip and conductor. The stud is configured so as to be connected to a tire and to provide near field communication. The stud also may be coupled to an antenna structure to provide a far field RFID tag. The stud may unintentionally move with respect to the antenna structure during use, so the antenna structure may be configured to accommodate such movement without a change in the tuning of the RFID tag. A multi-antenna label may be provided to allow for selective coupling of the stud to a particular antenna, with differently configured tires being coupled to different antennas of the same type of multi-antenna label, which allows for the same label configuration to be used with a wider variety of tires.

16 Claims, 3 Drawing Sheets

(58) Field of Classification Search
USPC .......................................................... 235/451
See application file for complete search history.

(56) References Cited

U.S. PATENT DOCUMENTS

| | | | |
|---|---|---|---|
| 8,231,060 | B2 | 7/2012 | Tucker |
| 9,385,420 | B2 | 7/2016 | Tucker |
| 9,682,598 | B2 | 6/2017 | Lesesky et al. |
| 2002/0093422 | A1 | 7/2002 | Shimura |
| 2006/0164520 | A1 | 7/2006 | Kawai |
| 2007/0158436 | A1 | 7/2007 | Ichikawa et al. |
| 2015/0189770 | A1 | 7/2015 | Loop |
| 2017/0206446 | A1* | 7/2017 | Lesesky ........... G06K 19/07764 |
| 2017/0357887 | A1* | 12/2017 | Wei ....................... B60C 11/246 |
| 2017/0358839 | A1 | 12/2017 | Wu et al. |
| 2018/0157951 | A1* | 6/2018 | Burgbacher ............ B25B 27/14 |
| 2018/0174015 | A1* | 6/2018 | Destraves ........... B60C 23/0452 |
| 2019/0217562 | A1 | 7/2019 | Uijlenbroek |
| 2019/0244074 | A1 | 8/2019 | Borgna et al. |
| 2019/0322142 | A1* | 10/2019 | Lallement ........... B60C 17/0009 |
| 2021/0053306 | A1* | 2/2021 | Cassidy ........... G06K 19/07722 |

FOREIGN PATENT DOCUMENTS

| | | |
|---|---|---|
| JP | 2001-013042 | 1/2001 |
| JP | 2002-214060 | 7/2002 |
| JP | 2002-264617 | 9/2002 |
| JP | 2005-096423 | 4/2005 |
| JP | 2005-216077 | 8/2005 |
| JP | 2005-316596 | 11/2005 |
| JP | 2017-132292 | 8/2017 |
| JP | 2018-027777 | 2/2018 |
| KR | 100851420 | 8/2008 |
| RU | 182706 U1 | 8/2018 |

OTHER PUBLICATIONS

International Search Report and Written Opinion dated Apr. 19, 2021 issued in corresponding IA No. PCT/US2020/067143 filed Dec. 28, 2020.

\* cited by examiner

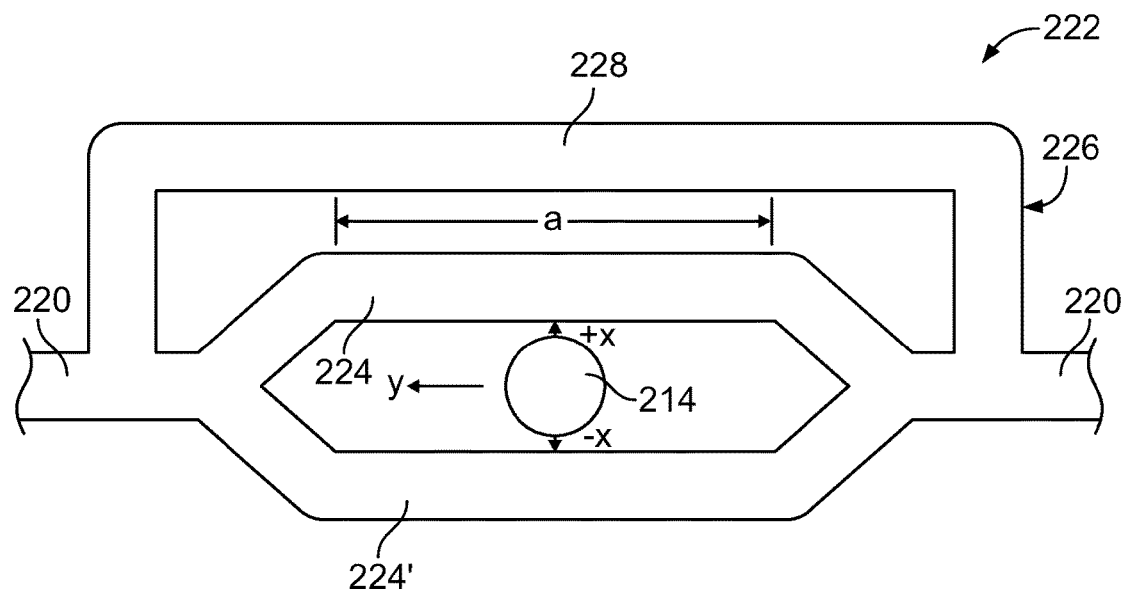
FIG. 3
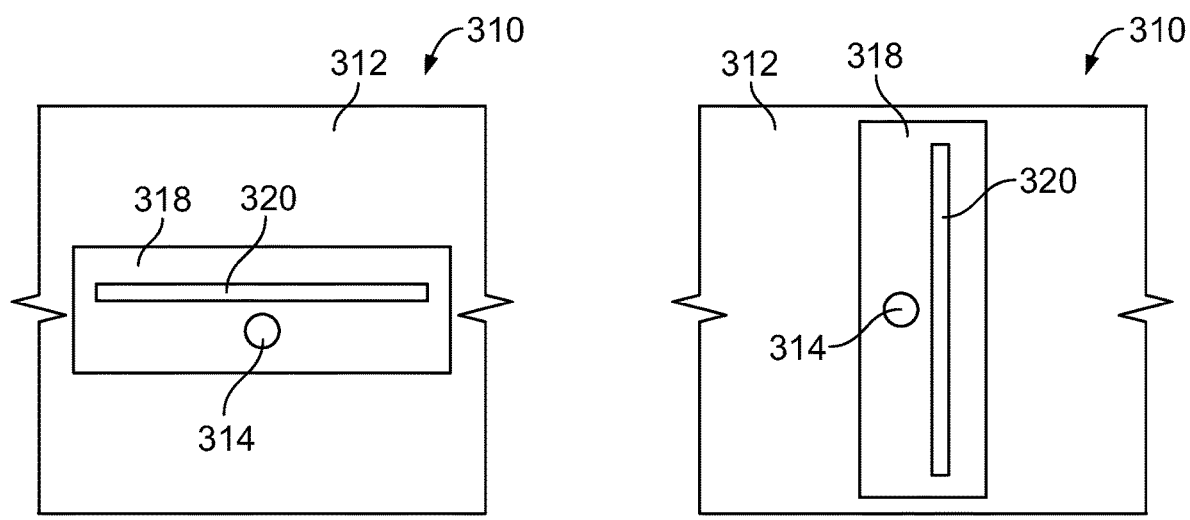
FIG. 4a  FIG. 4b

RFID SYSTEMS FOR USE WITH TIRES

The present application is a 371 of International Application No. PCT/US2020/06143, which was published in English on Jul. 1, 2021, and claims the benefit of U.S. Provisional Patent Application No. 62/954,475 filed Dec. 28, 2019, both of which are incorporated herein by reference in their entireties.

FIELD

The present subject matter relates broadly to wireless communication devices attached to tires. More particularly, the present subject matter relates to radio frequency identification ("RFID") systems for use with tires, wherein the systems include a stud having reactive strap technology for near field communication.

BACKGROUND

Devices incorporating wireless communication approaches including radio frequency identification (RFID) technology are widely used for a variety of different applications, including incorporation into merchandise labels or tags for tracking, and security purposes. Systems containing such devices are known for inventory control and security (e.g., loss prevention).

Prior art methods of tagging a tire with an RFID device typically include an RFID label that is manufactured as a single part that combines an RFID strap and an antenna. The RFID system is capable of transmitting signals to and/or receiving signals from another RFID device, for example, an RFID reader system. The single part is applied to the tire internal or external surface. A single part construction unfortunately has drawbacks in that it must be designed to be associated with a single tire product. This increases costs and the volume of parts necessary if there is a desire to tag tires having differing characteristics, such as different models or sizes. Tires also present a challenging and dynamic environment, which can be difficult to address when attempting to provide RFID tag systems.

SUMMARY

There are several aspects of the present subject matter which may be embodied separately or together in the wireless communication devices and systems described and claimed herein. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

Devices containing a stud that incorporates RFID reactive strap technology, systems containing the device, and methods of making and using thereof are described herein. In some embodiments, the stud is designed to be inserted into either an external tread of a tire or mounted to an external or internal surface of a tire. The stud may provide near field communication or be associated with and coupled to an antenna structure, such as may be incorporated into a label and applied to the external or internal surface of a tire.

In some embodiments, the label may contain an antenna where the characteristics of the RFID tag formed by placing it in proximity to the stud are changed by altering the relative registration or relative positioning of the antenna structure and/or stud. Advantageously, in some embodiments, the label may contain a single antenna with adaptable characteristics or multiple antennas. The ability to change the characteristics of the RFID tag using a single, common design for the stud that incorporates reactive strap technology and that can be inserted into or applied to a surface of a tire by the tire manufacturer would allow compensation for the extremely diverse characteristics of a tire, which is composed of a three-dimensional structure of metal and dielectrics. The stud may be used in a number of areas in the supply chain of tires, depending on the needs of the customers. For example, the stud may be used by the manufacturer to track tires through production, where, if required, a robust construction capable of withstanding heat and pressure may be used.

By adding a label with an antenna to be coupled to the reactive strap technology of the stud, an RFID tag may be formed and may provide long range RFID performance for inventorying finished tires, and may be used after the tire is fitted to a vehicle, for short term identification by a car dealer, where generally the label is removed. However, if required and designed to survive road use, the label may remain in place to permit the RFID tag to provide tracking and traceability to a vehicle owner, for example a private user, fleet user, taxi or rental car company.

In some embodiments, an RFID system for use with a tire is provided. In some embodiments, the system includes a stud containing reactive strap technology including an RFID chip and conductor. The stud is configured so as to be connected to a tire and to provide near field communication.

In other embodiments, an antenna structure is disposed on an inside surface or outside surface of the tire or inside of the tire, and the antenna structure couples with the stud via magnetic fields, electric fields or a combination of magnetic and electric fields, so as to form a far field RFID tag.

BRIEF DESCRIPTION OF THE DRAWINGS

FIG. 3 is a schematic view that illustrates a stud provided in combination with an adaptive far field antenna;

FIGS. 4a and 4b are schematic views that illustrate different possible orientations for the antenna of an RFID system provided in accordance with the present disclosure;

DETAILED DESCRIPTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
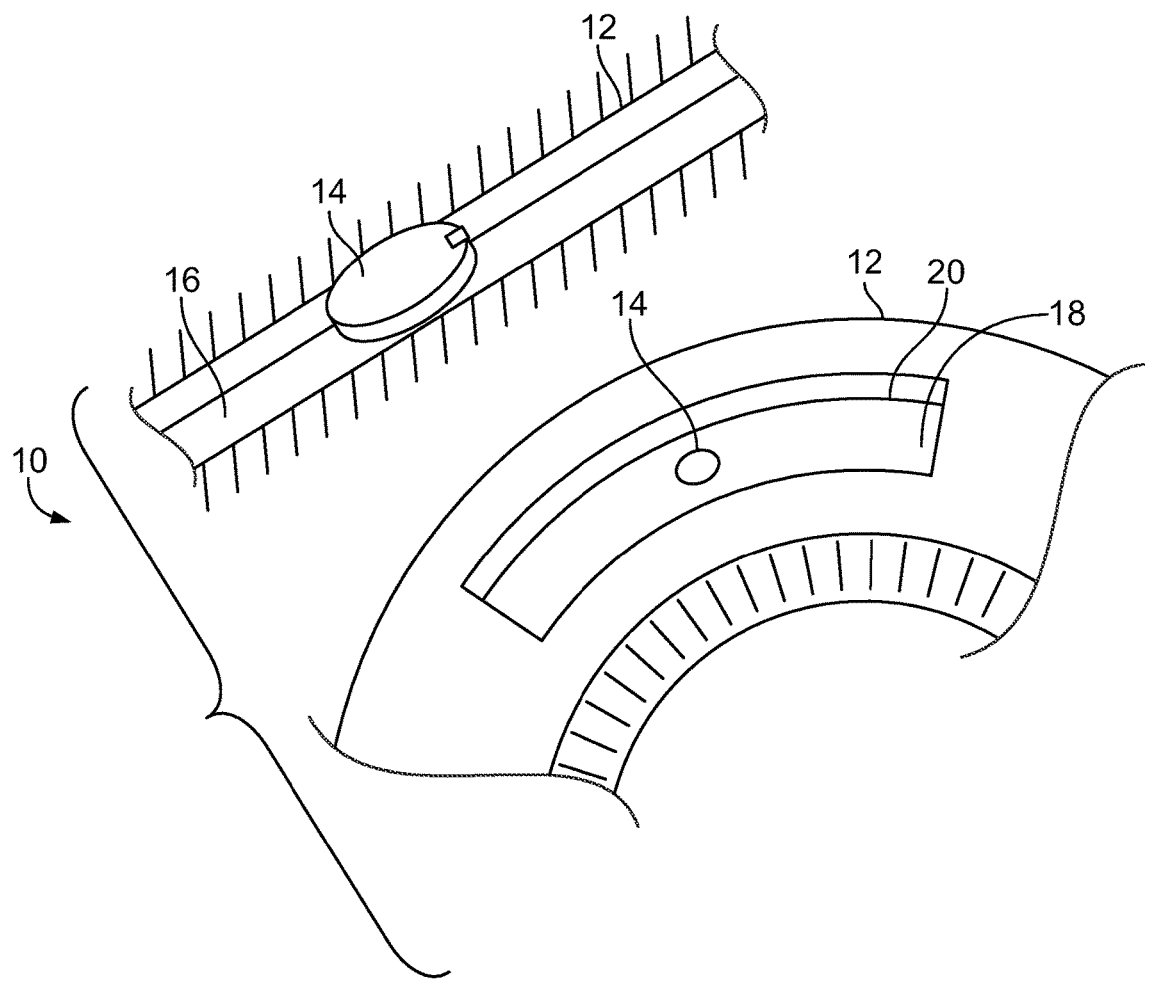
FIG. 1 is a schematic view of a two-part construction of an RFID tag according to an aspect of the present disclosure.

FIG. 1 is a schematic view that illustrates an RFID system 10 of two-part construction that is configured for use with a tire 12. The RFID system 10 includes a first part in the form of a stud 14 having reactive strap technology, which includes an RFID chip and conductor. The stud 14 is configured in a way that makes it compatible with connection to a tire at a selected mounting location. In this example, the mounting location is in a tread gap 16 and the stud 14 includes a body that encapsulates the RFID chip and conductor and is configured for insertion into the tread area of the tire 12, or alternatively into the sidewall of the tire 12. In some embodiments, the stud 14 is made of a robust construction and is constructed using an epoxy or acrylic material that encapsulates the RFID chip and conductor.

The second part of the RFID system 10 is a label 18 containing a conductive structure in the form of one or more antennas, such as antenna structure 20. When the label 18 is placed in proximity to the stud 14, the antenna 20 couples with the reactive strap technology of the stud 14 and collectively forms an RFID tag. The antenna structure 20 may be disposed on an internal surface or external surface of the tire or be embedded in the tire, with the antenna structure 20 coupling with the stud 14 via magnetic fields, electric fields, or a combination of magnetic and electric fields, so as to form a far field RFID tag.

"Stud" as used herein refers to a structure for adhering, attaching or affixing the reactive strap to a tire. In some embodiments, the stud is designed to be inserted into a tread of a tire, and gripped by the edges of the gap. However, alternate structures, such as flat disk, a linear strip, a threaded structure, and expanding structure based on a mechanical expansion and/or a chemical reaction such as an expanding polyurethane foam to anchor it to the tire could be suitable. Generally, the structure used needs to be robust, as tires as subject to stress when being stored before applying to a vehicle, by rolling, dropping etc., stress during fitting, and stress associated with movement of a vehicle it is attached to if intended to be used at that stage of the tire use. The stud may be of alternative construction. For example, in some embodiments, the stud may include an adhesive component configured for connection to a surface of the tire, with the RFID chip and conductor (which is a near field conductive element) located between thin layers (for example 125 um, of polyethylene terephthalate (PET) or other suitable polymeric or non-polymeric materials) of the adhesive component. In some embodiments, an outer surface of one of the thin layers may include adhesive for bonding the stud to an internal surface or external surface of the tire, such that the stud is removable from the tire. Another alternative construction may include having the stud (including the RFID chip and conductor) incorporated into a label that is configured to be affixed to an internal surface or an external surface of the tire, such as by using adhesive. Such a label version of the stud may alternatively be configured to be affixed to an internal surface of the tire by being vulcanized into the tire during manufacture of the tire.

Figure 2:
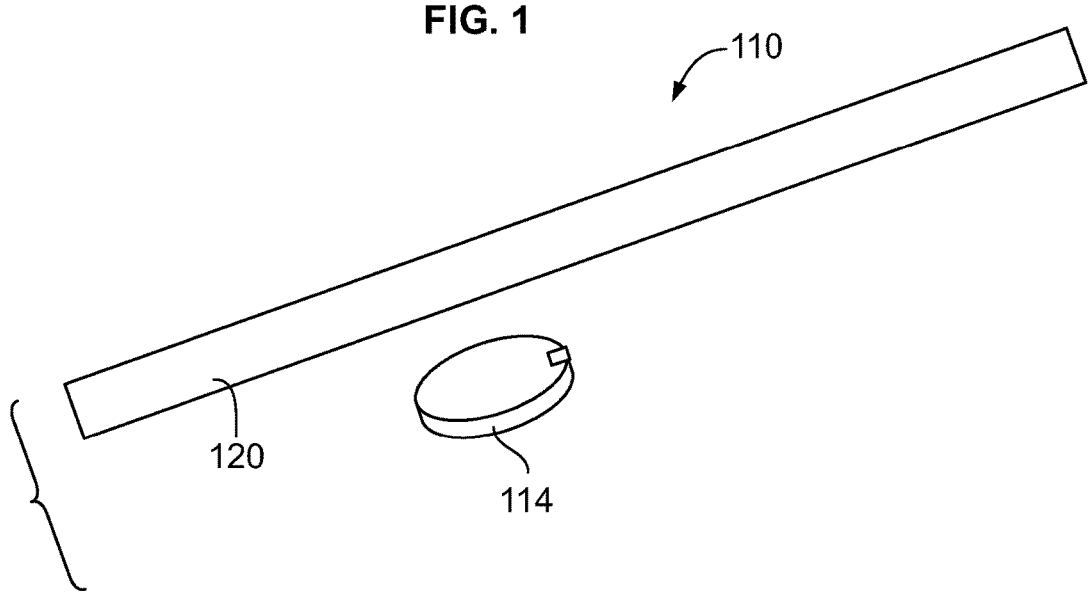
FIG. 2 is a schematic view of another embodiment of an RFID system according to another aspect of the present disclosure.

FIG. 2 is a schematic view of an exemplary RFID system 110 of two-part construction for use with a tire. A stud 114 having reactive strap technology that may be used alone for near field communication may be placed into proximity with an antenna structure 120. The antenna structure may be located on an internal surface or an external surface of the tire. The antenna structure 120 and location for proximity coupling with the stud 114 may be adjusted to achieve coupling via magnetic fields, electric fields, or a combination of fields, so as to form a far field RFID tag.

The antenna 222 shown in FIG. 3 includes a first part in the form of a stud 214 for connection to a tire and a second part in the form of an antenna structure 220, a portion of which is shown. The antenna structure 220 includes an adaptive far field antenna 222 designed to provide relatively constant coupling between the near field element in the form of the stud 214 and the adaptive far field antenna 222, when the registration of the stud 214 to the antenna 222 varies unintentionally. This may be particularly useful in the dynamic environment experienced by a tire.

The adaptive far field antenna 222 includes first and second parallel elements 224, 224' and the stud 214 has a nominal mounting position between the first and second parallel elements 224, 224'. With this configuration, relative movement +x of the stud 214 toward the first parallel element 224 increases coupling with the first parallel element 224, and coincides with affecting movement −x of the stud 214 away from the second parallel element 224' which reduces coupling with the second parallel element 224', thereby yielding a relatively constant net coupling of the stud 214 with the antenna structure 220.

In addition, coupling of the stud 214 with the adaptive far field antenna 222 occurs during movement of the stud 214 in the y direction and over a length a that runs parallel to the first and second parallel elements 224, 224' of the antenna structure 220. This coupling remains relatively constant due to the first and second parallel elements 224, 224' being symmetrical over the length a of the movement. Thus, overall, this will result in net coupling, x+y. which remains relatively constant. The adaptive far field antenna 222 essentially is part of a tuning loop of the antenna structure 220 that has a bypass element 226 that includes a third parallel element 228 that runs parallel to and extends beyond the first and second parallel elements 224, 224'.

FIGS. 4a and 4b show schematic views of a two-part RFID system 310 similar to the system 10 shown in FIG. 1 but which permits the first part, in the form of a stud 314 to be located on the tire 312, such as by insertion into the tread region of the tire 312, while the second part, in the form of a label 318 including an antenna structure 320, may be connected to the tire 312 in two or more orientations relative to the stud 314 and tire 312. A first of two orientations is illustrated in FIG. 4a, where the antenna structure 320 is parallel to the tire 312 and the direction of the tread. A second orientation is illustrated in FIG. 4b, where the antenna structure 320 is perpendicular to and extends across the width of the tire 312. Tires have very diverse properties and sometimes it is advantageous, in the case of a dipole form antenna, to have the antenna either cross the tread (i.e., perpendicular to the tread) or extend along and parallel to the tread. A common reactive device such as stud 314 may work with a number of antenna designs that can be selected for use in different orientations for individual tires.

It will be appreciated that the examples described herein provide a series of options to utilize a two part RFID system or tag for a tire. In the examples shown, the near field element is a stud that may be applied during manufacture, and associated with the tire, allowing traceability and monitoring of production as the short range capability is suitable for a controlled environment such as a factory production line. When the tire is passed to a retailer, a label having an RFID antenna may be connected to the tire allowing longer range reading in an uncontrolled environment, such as shelving for inventory purposes. When a tire is fitted with the label and the label and stud that includes the reactive strap technology are removed, they may be disposed of or recycled, if the materials are compatible, or they may be recovered, and with reprogramming, they may be re-used, if the stud is robust enough. Alternatively, the reactive device in the form of the stud may be retained for a short term period, such as when a dealer is selling cars, vans and trucks to the public and may wish to monitor for inventory and traceability purposes. Alternatively, the device may be retained, where short range reading may be used during servicing, etc., but does not present a direct privacy issue.

Figure 5:
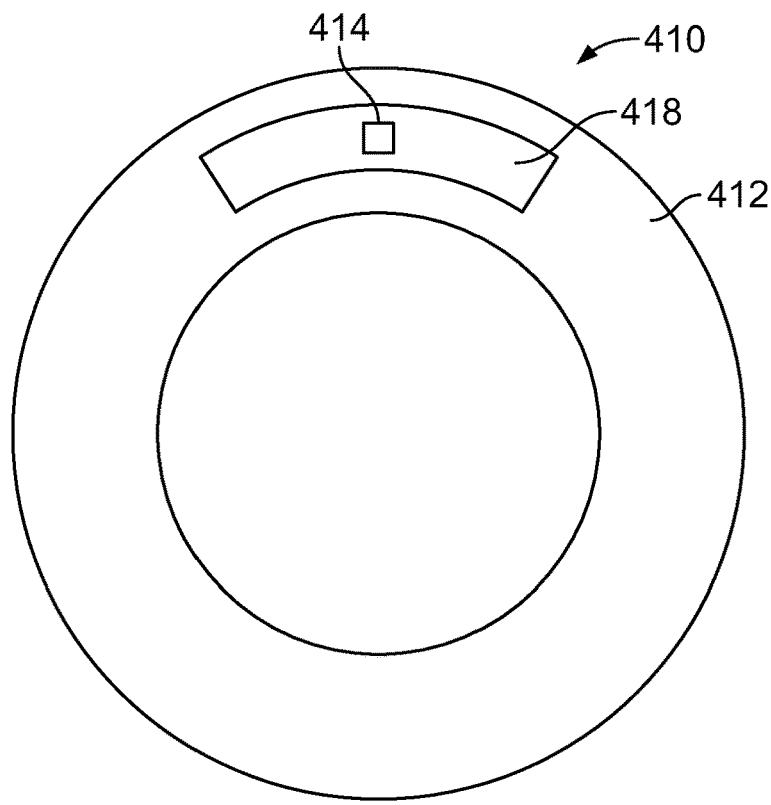
FIG. 5 is a schematic view of another embodiment of an RFID system according to an aspect of the present disclosure.

FIG. 5 is a schematic view showing an alternative arrangement for an RFID system 410 where a near field device, such as a stud 414, is applied inside a tire 412, and couples to an antenna structure incorporated into a label 418 that is externally applied to the tire 412. The stud 414 may be retained for the previously described purposes. Using a stud having reactive strap technology and near field communication capabilities inside the tire 412 in combination with a label 418 to provide a far field RFID tag has advantages over using a conventional unitary far field RFID tag; generally in that a near field device is smaller, more easily made robust, and will be exposed to lower stresses from bending, stretching, etc., during use of the tire.

Figure 6:
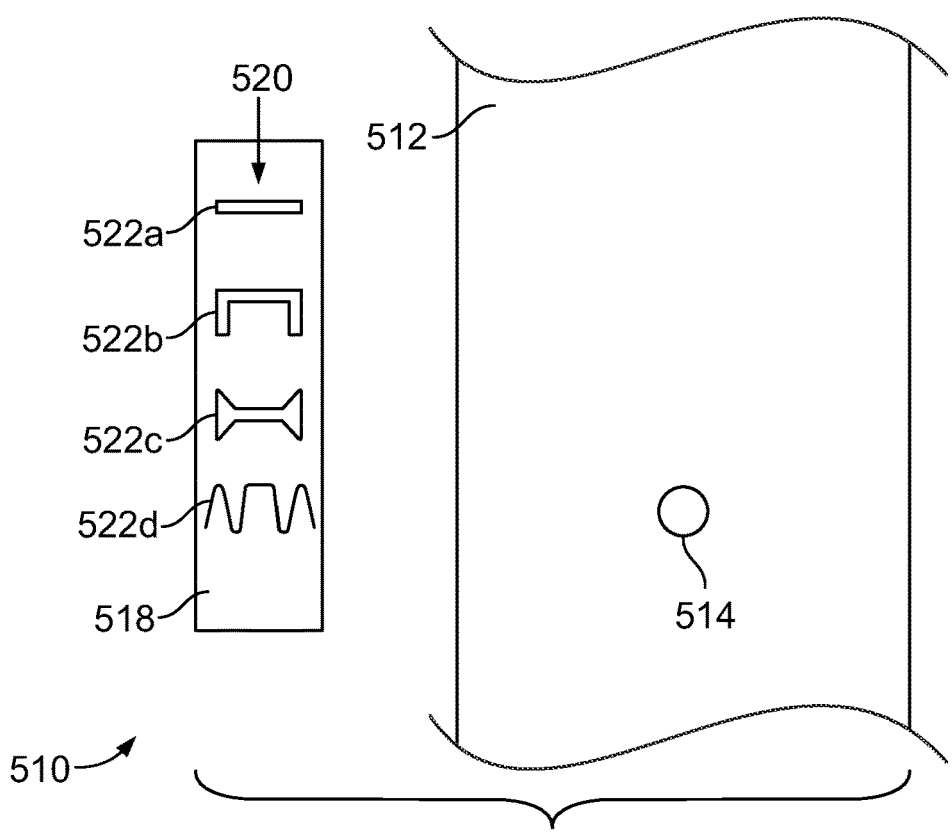
FIG. 6 is a schematic view showing an RFID system employing the combination of a stud and a multi-antenna label.

FIG. 6 is a schematic view of an RFID system 510 for use with a tire 512, where a first part having reactive near field capability is provided in the form of a stud 514 that is connected to an internal surface, an external surface or incorporated into the tire 512, and a second part is provided in the form of a label 518 including an antenna structure 520 that includes multiple antennas 522a-522d. The multiple antennas 522a-522d couple differently to the stud 514 when the relative position between the stud 514 and the antenna structure 520 is changed. The optimum choice of one of the antennas and the relative position of the antenna structure 520 may be chosen by experiment, changing the relative registration of the label 518 to the stud 514, which is less complex and lower cost than designing custom, customer-specific antennas for every customer and each tire sold by the customer. Once an optimum antenna configuration has been chosen, a single multi-antenna label 518 may be used with a variety of tire products and may continue to be used, or another label with only a selected antenna that is specific to a given tire may be used. Thus, the characteristics of an RFID system 510 or RFID tag that is formed by placement of the antenna structure 520 in proximity to the stud 514 are changed by altering the relative registration of the antenna structure 20 and stud 514, which could be done for a group of different tires.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A radio frequency identification (RFID) system for use with a tire comprising:
    a stud, wherein the stud comprises a reactive strap comprising an RFID chip and a conductor, the stud being configured so as to be connected to a tire and to provide near field communication; and
    an antenna structure disposed on an internal surface or external surface of the tire or embedded in the tire, wherein the antenna structure is coupled with the stud via magnetic fields, electric fields, or a combination of magnetic and electric fields, so as to form a far field RFID tag.

2. The RFID system of claim 1, wherein the stud comprises an adhesive component configured for connection to a surface of the tire, with the RFID chip and conductor located between thin layers of a material of the adhesive component, and with an outer surface of one of the thin layers further comprising an adhesive.

3. The RFID system of claim 1, wherein the stud comprises a body that encapsulates the RFID chip and conductor and is configured for insertion into a tread area or sidewall of the tire.

4. The RFID system of claim 3, wherein an epoxy or acrylic material is used to encapsulate the RFID chip and conductor.

5. The RFID system of claim 1, wherein the stud is incorporated into a label that is configured to be affixed to an internal surface or an external surface of the tire using adhesive.

6. The RFID system of claim 1, wherein the stud is incorporated into a label that is configured to be affixed to an internal surface of the tire by being vulcanized into the tire.

7. The RFID system of claim 1, wherein the antenna structure further comprises an adaptive far field antenna that provides relatively constant coupling with the stud.

8. The RFID system of claim 7, wherein the adaptive far field antenna comprises first and second parallel elements and the stud comprises a nominal mounting position between the first and second parallel elements, such that a relative movement of the stud toward and an increase in coupling with the first parallel element coincides with movement of the stud away from and a decrease in coupling with the second parallel element, so as to yield a relatively constant net coupling with the antenna structure.

9. The RFID system of claim 8, wherein coupling of the stud with the antenna structure during relative movement of the stud parallel to the first and second parallel elements of the adaptive far field antenna remains relatively constant due to the parallel elements being symmetrical over a length of the relative movement.

10. The RFID system of claim 8, wherein the antenna structure further comprises a tuning loop that has a bypass element that includes a third parallel element that runs parallel to and extends beyond the first and second parallel elements.

11. The RFID system of claim 1, wherein the antenna structure further comprises an adhesive to connect to an internal surface or an external surface of the tire.

12. The RFID system of claim 11, wherein the antenna structure is removable from the tire.

13. The RFID system of claim 1, wherein the antenna structure is configured for placement relative to the stud in two or more orientations.

14. The RFID system of claim 13, wherein the antenna structure further comprises a dipole antenna.

15. A radio frequency identification (RFID) system for use with a tire comprising:
    a stud, wherein the stud comprises a reactive strap comprising an RFID chip and a conductor, the stud being configured so as to be connected to a tire and to provide near field communication; and
    an antenna structure comprising a multi-antenna label, wherein an RFID tag is formed by coupling of the stud and the multi-antenna label, depending on positioning of the respective antennas within the multi-antenna label relative to the stud.

16. The RFID system of claim 15, wherein characteristics of an RFID tag formed by placement of the antenna structure in proximity to the stud are changed by altering the relative registration of the antenna structure and the stud.

* * * * *